(12) United States Patent
Wang (10) Patent No.: US 10,723,487 B2
(45) Date of Patent: Jul. 28, 2020

(54) SYSTEMS AND METHODS FOR DETECTING AIRCRAFT MAINTENANCE EVENTS AND MAINTENANCE INTERVALS

(71) Applicant: The Boeing Company, Seal Beach, CA (US)

(72) Inventor: Zhennong Wang, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 156 days.

(21) Appl. No.: 13/967,729

(22) Filed: Aug. 15, 2013

(65) Prior Publication Data

US 2015/0051786 A1 Feb. 19, 2015

(51) Int. Cl.
*B64F 5/60* (2017.01)

(52) U.S. Cl.
CPC ...................... *B64F 5/60* (2017.01)

(58) Field of Classification Search
CPC ..................................................... G06Q 10/06
USPC ....................................................... 701/29.4
See application file for complete search history.

(56) References Cited

U.S. PATENT DOCUMENTS

| | | | |
|---|---|---|---|
| 6,418,361 B2 | 7/2002 | Sinex | |
| 6,442,459 B1 | 8/2002 | Sinex | |
| 6,606,546 B2 | 8/2003 | Sinex | |
| 6,671,593 B2 | 12/2003 | Sinex | |
| 6,691,006 B2 | 2/2004 | Sinex | |
| 6,795,758 B2 | 9/2004 | Sinex | |
| 7,167,786 B2 | 1/2007 | Sinex | |
| 8,195,535 B2 | 6/2012 | Nagalla et al. | |
| 2008/0154458 A1* | 6/2008 | Brandstetter et al. | 701/29 |
| 2009/0125277 A1* | 5/2009 | Wetzer et al. | 702/184 |
| 2013/0112807 A1 | 5/2013 | Cox et al. | |

* cited by examiner

*Primary Examiner* — Michael D Lang
(74) *Attorney, Agent, or Firm* — Armstrong Teasdale LLP (57) ABSTRACT

A computing device for use in detecting maintenance events and maintenance intervals is provided. The computing device is configured to receive aircraft usage data for at least one carrier, identify at least one potential maintenance event in the usage data, identify at least one actual maintenance event in the usage data at least by comparing the usage data for a first aircraft of the at least one carrier to a second aircraft of the at least one carrier during each potential maintenance event, determine an indicator used by each carrier for scheduling maintenance events, determine a maintenance interval for each carrier for an aircraft model associated with at least the first aircraft.

20 Claims, 10 Drawing Sheets

SYSTEMS AND METHODS FOR DETECTING AIRCRAFT MAINTENANCE EVENTS AND MAINTENANCE INTERVALS

BACKGROUND

The present disclosure relates generally to maintenance of aircraft, and more particularly to systems and methods for discovering when and how often airline operators ("carriers") perform aircraft heavy maintenance events.

When a carrier takes a delivery of an aircraft, the carrier is incentivized to operate the aircraft as much as possible to generate maximum revenues. Therefore the carrier keeps the aircraft's monthly usage at a relatively high level unless the carrier must take the aircraft out of service for heavy maintenance events (e.g., C and D checks). Heavy maintenance events keep aircraft out of service for two weeks or more.

Aircraft manufactures generally recommend heavy maintenance intervals to carriers. However carriers may modify the recommendations with the approval of their aviation authority. Moreover, carriers may change the heavy maintenance intervals due to airworthiness directives (AD) from aviation authorities over the life of their aircraft. Accordingly, maintenance intervals may vary from carrier to carrier and from one aircraft model to another aircraft model.

In addition, different carriers may use different indicators or metrics to determine when a maintenance event should be performed. For example, a first carrier may use a cumulative number of flight hours since a previous maintenance event as an indicator of when the next maintenance event should take place. A second carrier may use a number of flight cycles as an indicator, and a third carrier may use a total amount of time that has elapsed since the last maintenance event. Furthermore, a single carrier may use different types of indicators for different aircraft within the carrier's fleet. Generally, however, once a carrier has determined what indicator to use for a type of aircraft within the carrier's fleet, the carrier applies the indicator on all aircraft of the same type in its fleet.

Given the variations in how different carriers track and schedule aircraft maintenance events, it is challenging for a maintenance, repair, and overhaul provider ("MRO") to predict maintenance events and obtain replacement aircraft components in preparation for the maintenance events. Accordingly, systems and methods that facilitate predicting when such maintenance events will occur are desired.

BRIEF DESCRIPTION

In one aspect, a computing device for use in detecting maintenance events and maintenance intervals is provided. The computing device is configured to receive aircraft usage data for at least one carrier, identify at least one potential maintenance event in the usage data, identify at least one actual maintenance event in the usage data at least by comparing the usage data for a first aircraft of the at least one carrier to a second aircraft of the at least one carrier during each potential maintenance event, determine an indicator used by each carrier for scheduling maintenance events, determine a maintenance interval for each carrier for an aircraft model associated with at least the first aircraft.

In another aspect, a method for use in detecting maintenance events and maintenance intervals is provided. The method includes receiving, at a computing device, aircraft usage data for at least one carrier. The method additionally includes identifying, by the computing device, at least one potential maintenance event in the usage data and identifying, by the computing device, at least one actual maintenance event in the usage data at least by comparing the usage data for a first aircraft of the at least one carrier to a second aircraft of the at least one carrier during each potential maintenance event. The method also includes determining, by the computing device, an indicator used by each carrier for scheduling maintenance events and determining, by the computing device, a maintenance interval for each carrier for an aircraft model associated with at least the first aircraft.

In another aspect, a non-transitory computer-readable storage device having computer-executable instructions embodied thereon for use in detecting maintenance events and maintenance intervals is provided. When executed by a computing device, the computer-executable instructions cause the computing device to receive aircraft usage data for at least one carrier, identify at least one potential maintenance event in the usage data, identify at least one actual maintenance event in the usage data at least by comparing the usage data for a first aircraft of the at least one carrier to a second aircraft of the at least one carrier during each potential maintenance event, determine an indicator used by each carrier for scheduling maintenance events, and determine a maintenance interval for each carrier for an aircraft model associated with at least the first aircraft.

DETAILED DESCRIPTION

Embodiments of the systems and methods described herein facilitate determining when a carrier has maintained its aircraft, what maintenance intervals the carrier follows, and what the carrier uses to indicate maintenance events in its records. Embodiments of the systems and methods use data mining, statistics, adaptive learning, and combinatorial and clustering process to analyze aircraft usage data, for example monthly usage data, and detect maintenance events and maintenance intervals. Additionally, the systems and methods take into account exogenous events and temporary parking of aircraft in detecting maintenance events and maintenance intervals. As described in more detail herein, certain implementations of the systems and methods initially use recommended maintenance intervals provided by an aircraft manufacturer and once a first maintenance event and a first maintenance interval is detected, the systems and methods use the detected maintenance events and maintenance intervals to detect additional maintenance events and maintenance intervals. Additionally, implementations of the described systems and methods cluster potential maintenance events into groups. Additionally, implementations use a combinatorial and clustering process to enhance the groups and detect additional maintenance events. Moreover, implementations normalize variances in flight hours, flight cycles, and elapsed aircraft ownership time periods (e.g., months) and determine which of the three types of data is used by a carrier as an indicator of maintenance events and maintenance intervals.

Figure 1:
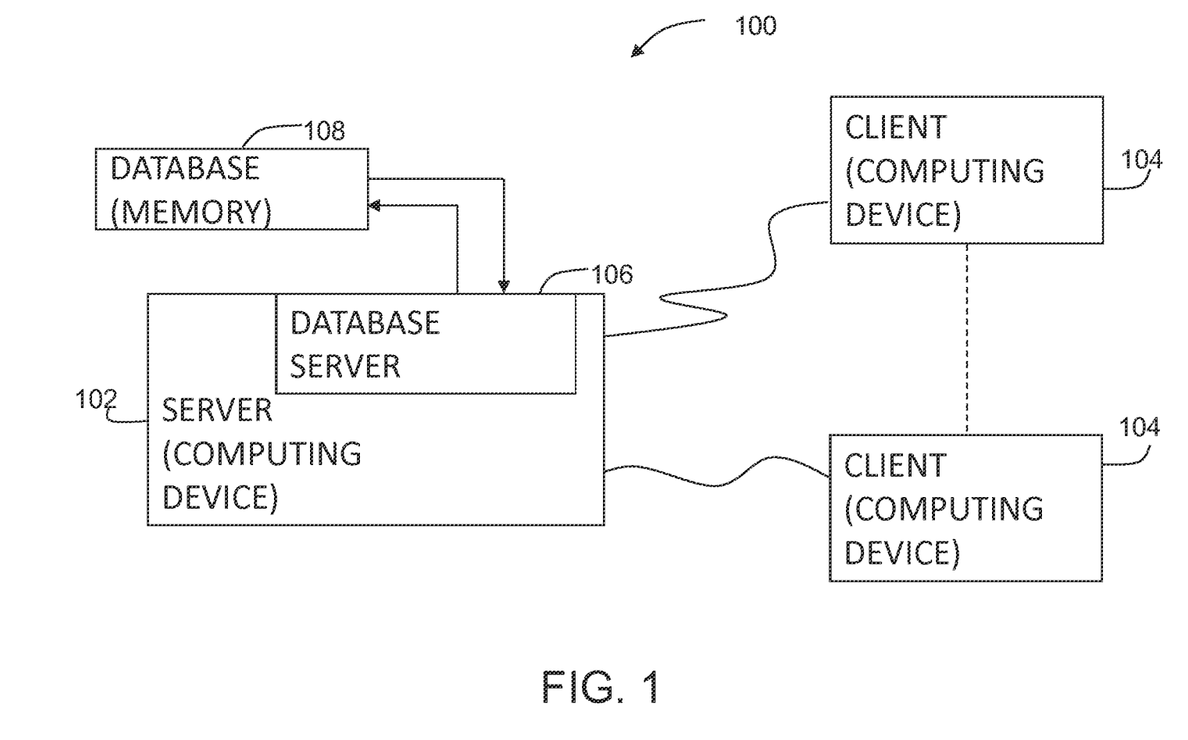
FIG. 1 is a simplified block diagram of an example detection system including a plurality of computing devices.

FIG. 1 is a simplified block diagram of an example detection system 100 in accordance with one implementation of the present disclosure. System 100 includes a server system 102 and a plurality of client systems 104 (also referred to as client computing devices), connected to server system 102. In one embodiment, client systems 104 are computers including a web browser, such that server system 102 is accessible to client systems 104 using the Internet. Client systems 104 are interconnected to the Internet through many interfaces including a network, such as a local area network (LAN) and/or a wide area network (WAN), dial-in connections, cable modems, wireless-connections, and special high-speed ISDN lines. Client systems 104 may be any device capable of interconnecting to the Internet including a web-based phone, personal digital assistant (PDA), or other web-connectable equipment. A database server 106 is connected to a database 108 containing information on a variety of matters, as described below in greater detail. In one embodiment, database 108 is stored on server system 102 and may be accessed by potential users at one of client systems 104 by logging onto server system 102 through one of client systems 104. In any alternative implementation, database 108 is stored remotely from server system 102 and may be non-centralized. Server system 102 could be any type of computing device configured to perform the steps described herein. As discussed below, historical maintenance events for various types of aircraft, from multiple carriers, is stored within database 108.

Figure 2:
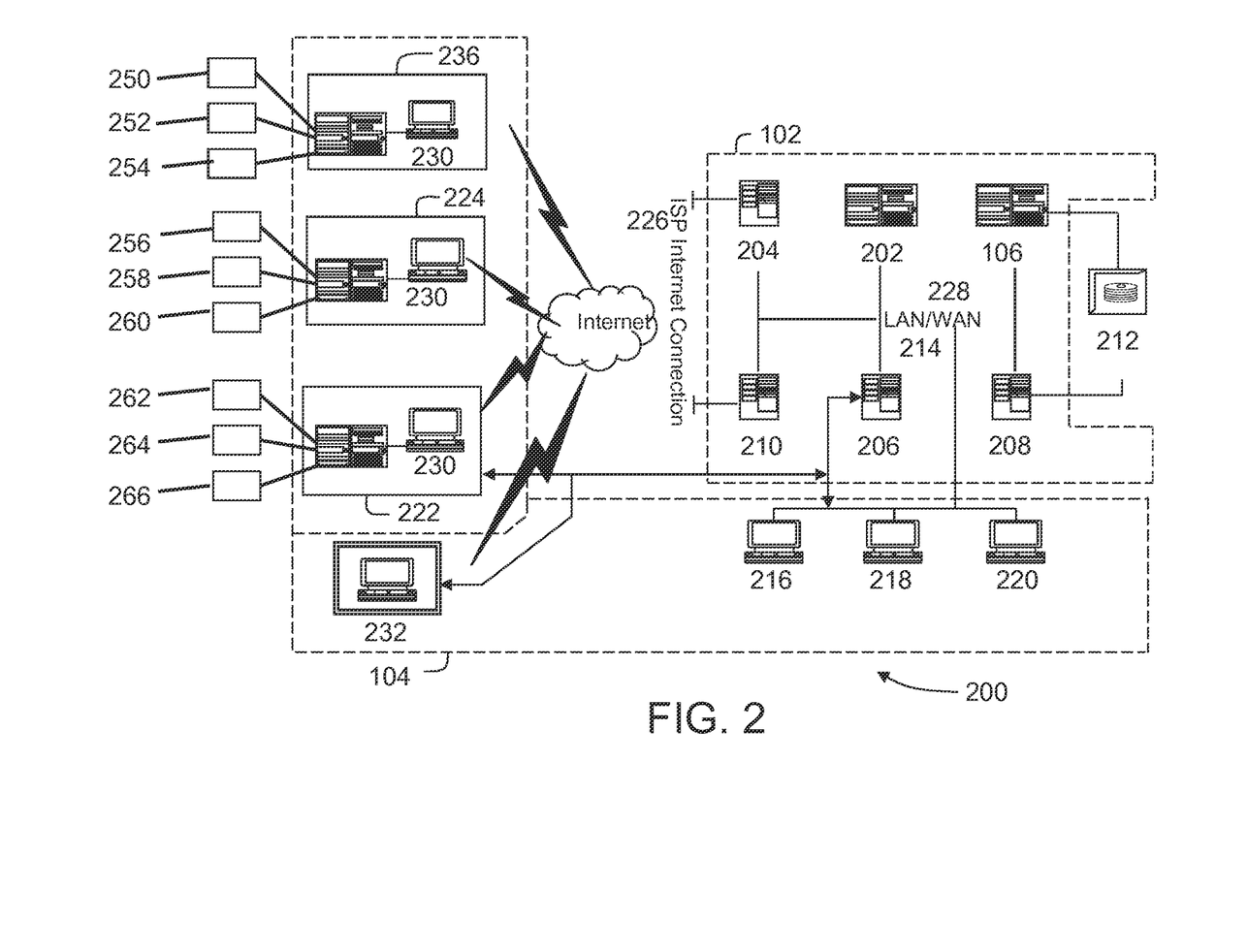
FIG. 2 is an expanded block diagram of an example server architecture of the detection system of FIG. 1, including the plurality of computing devices.

FIG. 2 is an expanded block diagram of an example server architecture 200 of detection system 100. Components in architecture 200, identical to components of detection system 100 (shown in FIG. 1), are identified in FIG. 3 using the same reference numerals used in FIG. 1. Architecture 200 includes server system 102 and client computing devices 104. Server system 102 further includes database server 106, an application server 202, a web server 204, a fax server 206, a directory server 208, and a mail server 210. A disk storage unit 212 is coupled to database server 106 and directory server 208. Servers 106, 202, 204, 206, 208, and 210 are coupled in a local area network (LAN) 214. In addition, a system administrator's workstation 216, a user workstation 218, and a supervisor's workstation 220 are coupled to LAN 214. Alternatively, workstations 216, 218, and 220 are coupled to LAN 214 using an Internet link or are connected through an Intranet.

Each workstation, 216, 218, and 220, is a personal computer having a web browser. Although the functions performed at the workstations typically are illustrated as being performed at respective workstations 216, 218, and 220, such functions can be performed at one of many personal computers coupled to LAN 214. Workstations 216, 218, and 220 are illustrated as being associated with separate functions only to facilitate an understanding of the different types of functions that can be performed by individuals having access to LAN 214.

Server system 102 is configured to be communicatively coupled to various entities, including carriers 222, 224, 236 using an Internet connection 226. Carrier 222 is associated with a fleet including a first aircraft 250, a second aircraft 252, and a third aircraft 254. Carrier 224 is associated with a fleet including a fourth aircraft 256, a fifth aircraft 258, and a sixth aircraft 260. Carrier 236 is associated with a fleet including a seventh aircraft 262, an eighth aircraft 264, and a ninth aircraft 266. Carriers 222, 224, 236 provide usage data regarding their respective fleets to server system 102. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 228, local area network 214 could be used in place of WAN 228.

In the example embodiment, any authorized individual or entity having a workstation 230 may access system 200. At least one of the client computing devices 104 includes a manager workstation 232 located at a remote location. Workstations 230 and 232 include personal computers having a web browser. Also, workstations 230 and 232 are configured to communicate with server system 102.

Figure 3:
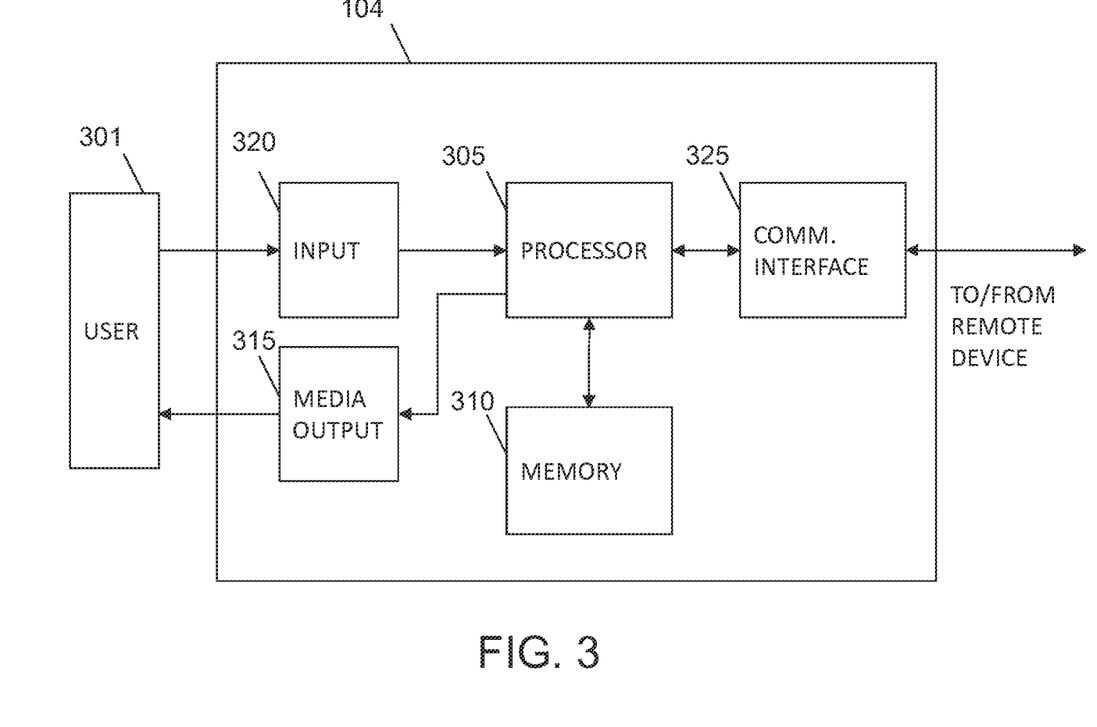
FIG. 3 is a block diagram of an example client system that may be used with the detection system of FIGS. 1 and 2.

FIG. 3 illustrates an example configuration of a client computing device 104 operated by a user 301. Client computing device 104 includes a processor 305 for executing instructions. In some embodiments, executable instructions are stored in a memory area 310. Processor 305 may include one or more processing units (e.g., in a multi-core configuration). Memory area 310 is any device allowing information such as executable instructions and/or other data to be stored and retrieved. Memory area 310 may include one or more computer-readable media.

Client computing device 104 also includes at least one media output component 315 for presenting information to user 104. Media output component 315 is any component capable of conveying information to user 301. In some embodiments, media output component 315 includes an output adapter such as a video adapter and/or an audio adapter. An output adapter is operatively coupled to processor 305 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some implementations, client computing device 104 includes an input device 320 for receiving input from user 301. Input device 320 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 315 and input device 320.

Client computing device 104 may also include a communication interface 325, which is communicatively couplable to a remote device such as server system 102 or a web server operated by a merchant. Communication interface 325 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 310 are, for example, computer-readable instructions for providing a user interface to user 301 via media output component 315 and, optionally, receiving and processing input from input device 320. A user interface may include, among other possibilities, a web browser and client application. Web browsers enable users, for example user 301, to display and interact with media and other information typically embedded on a web page or a website from server system 102. A client application allows user 301 to interact with a server application from server system 102.

Figure 4:
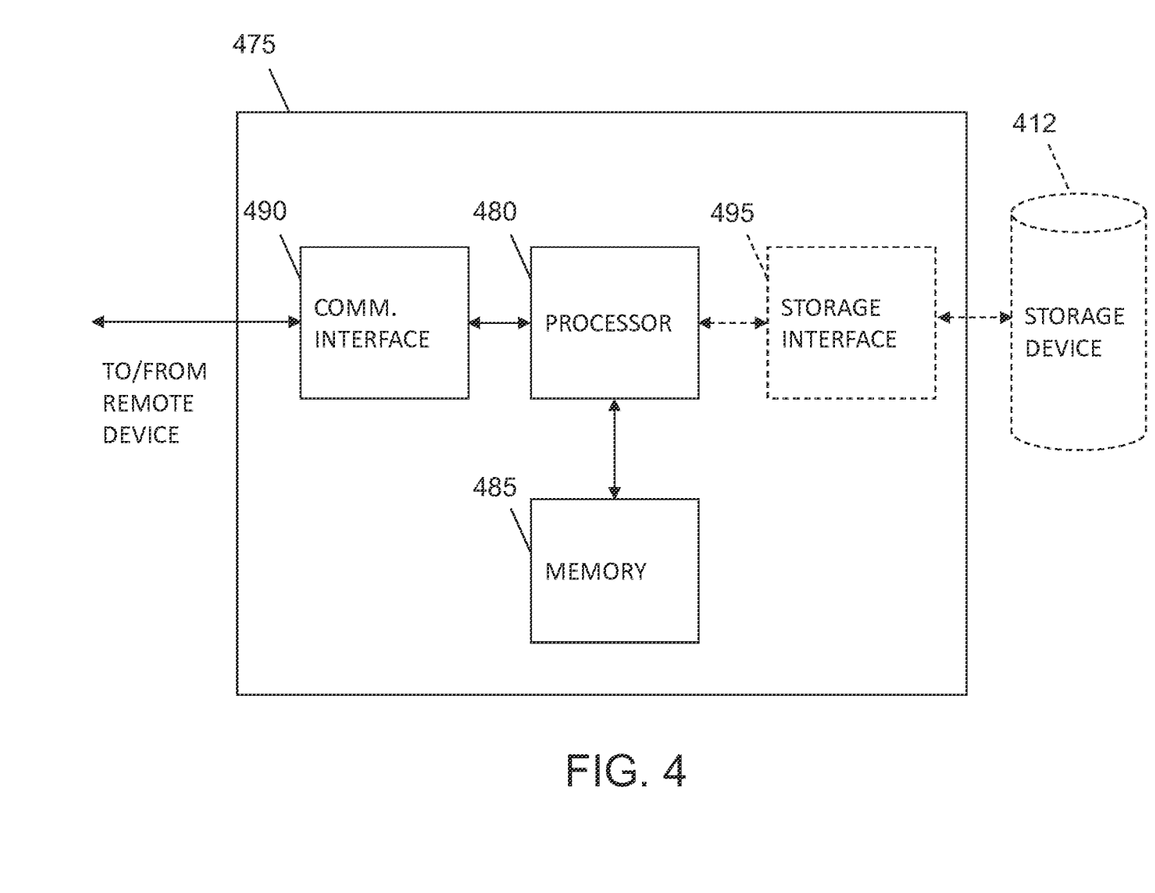
FIG. 4 is a block diagram of an example configuration of a server system that may be used with the detection system of FIGS. 1 and 2.

FIG. 4 illustrates an example configuration of a server computing device 475 such as server system 102 (shown in FIGS. 1 and 2). Server computing device 475 may include, but is not limited to, database server 106, application server 202, web server 204, fax server 206, directory server 208, and mail server 210.

Server computing device 475 includes a processor 480 for executing instructions. Instructions may be stored in a memory area 485, for example. Processor 480 may include one or more processing units (e.g., in a multi-core configuration).

Processor 480 is operatively coupled to a communication interface 490 such that server computing device 475 is capable of communicating with a remote device such as client computing device 104 or another server computing device 475. For example, communication interface 490 may receive requests from client computing devices 104 via the Internet, as illustrated in FIGS. 1 and 2.

Processor 480 may also be operatively coupled to a storage device 412. Storage device 412 is any computer-operated hardware suitable for storing and/or retrieving data. In some embodiments, storage device 412 is integrated in server computing device 475. For example, server computing device 475 may include one or more hard disk drives as storage device 412. In other embodiments, storage device 412 is external to server computing device 475 and may be accessed by a plurality of server computing devices 475. For example, storage device 412 may include multiple storage units such as hard disks or solid state disks in a redundant array of inexpensive disks (RAID) configuration. Storage device 412 may include a storage area network (SAN) and/or a network attached storage (NAS) system.

In some embodiments, processor 480 is operatively coupled to storage device 412 via a storage interface 495. Storage interface 495 is any component capable of providing processor 480 with access to storage device 412. Storage interface 495 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 480 with access to storage device 412.

Memory areas 310 and 485 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 5:
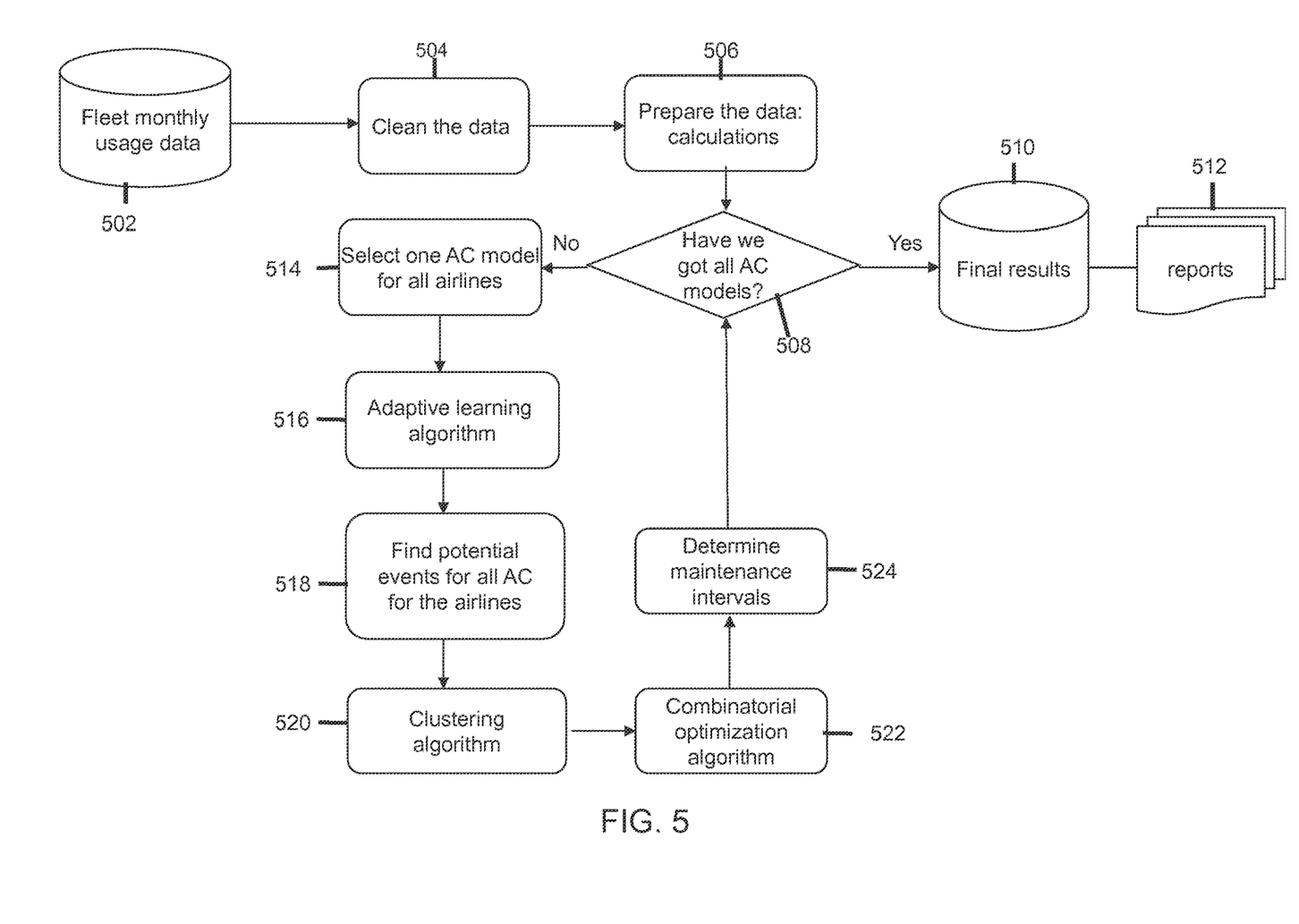
FIG. 5 is a high level flow chart of a process that may be implemented by the detection system of FIGS. 1 and 2 to detect maintenance events and determine maintenance intervals for aircraft.

FIG. 5 is a high level flow chart of a process 500 that may be implemented by detection system 100 (FIGS. 1 and 2), and more specifically server system 102 (FIGS. 1 and 2) to detect maintenance events and determine maintenance intervals for aircraft. Initially, server system 102 receives 502, from at least one of carriers 222, 224, and 236 monthly usage data regarding at least one aircraft. In some implementations, the usage data includes records, wherein each record specifies an identifier of the carrier 222, 224, 236, such as a name, code, or abbreviation. Each record additionally specifies a year, a month, a number of flight hours in the month, a number of flight cycles (i.e., flights) in the month, and an identifier of an aircraft, such as a tail number. In some implementations, database 108 or another memory device accessible to server system 102 may include a database correlating aircraft identifiers with aircraft models. In other implementations, the record of the usage data also includes an aircraft model identifier. Next, server system 102 cleans 504 the usage data, as described in more detail with reference to FIG. 6. Additionally, server system 102 prepares 506 the usage data for further analysis by calculating metrics such as cumulative flight hours, cumulative flight cycles, cumulative time that the carrier 222, 224, 236 has owned each aircraft, and stores the calculations with the usage data, as described in more detail with reference to FIG. 7.

Next, server system 102 determines 508 whether maintenance events and maintenance intervals have been detected for all models of aircraft represented in the usage data. If determination 508 is yes, then server system 102 stores 510 the detected maintenance events and maintenance intervals, for example in database 108 using database server 106, and generates 512 at least one report of the detected maintenance events and maintenance intervals, for example by transmitting the report to one of client computing devices 104.

If determination 508 is no, then server system 102 proceeds to select 514 one aircraft model for all carriers 222, 224, and 236 represented in the usage data. Next, server system 102 applies 516 an adaptive learning process to the usage data for the selected aircraft model as described in more detail with reference to FIG. 8. Next, server system 102 finds or detects 518 possible maintenance events for all aircraft for all carriers 222, 224, and 236 represented in the usage data. Next, server system 102 applies 520 a clustering process to the usage data, as described in more detail below. Next, server system 102 applies 522 a combinatorial process to the usage data. Subsequently, server system 102 determines 524 maintenance events and maintenance intervals in the usage data for the selected aircraft model. Next, server system 102 makes determination 508, described above.

Figure 6:
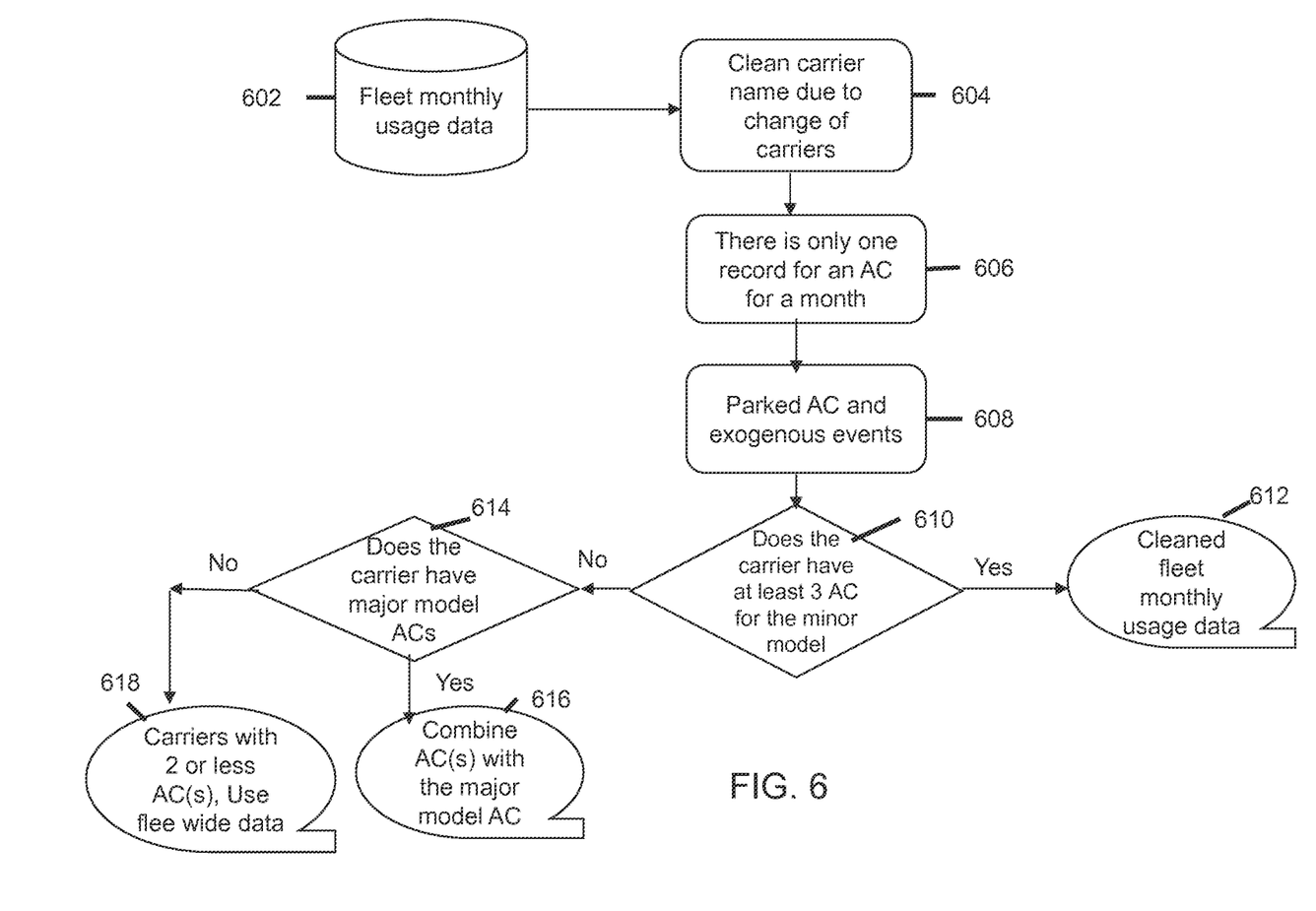
FIG. 6 is a flow chart of a process that may be implemented by the detection system of FIGS. 1 and 2 to clean usage data provided to the detection system.

FIG. 6 is a flow chart of a process 600 that may be implemented by detection system 100 to clean usage data. Process 600 corresponds with cleaning 504 the usage data in process 500. Initially, process 600 begins with retrieving 602 the usage data described with reference to process 500. Next, server system 102 cleans 604 carrier names due to a change of carriers associated with particular aircraft during a particular time period, for example one month. More specifically, server system 102 detects a change in carrier names in the usage data from a first carrier name, for example Carrier A, to a second carrier name, for example Carrier B, and changes the second carrier name to the first carrier name in the usage data. In other implementations, rather than changing the second carrier name to the first carrier name, server system 102 changes the first carrier name to the second carrier name in the usage data. Next, server system 102 ensures 606 that there is only one record for each aircraft within a given time period. More specifically, server system 102 removes any extraneous or duplicate records for each aircraft represented in the usage data for a given time period, for example a month. As an example, server system 102 may determine that within a first month, two records exist in the usage data for a first aircraft. The two records contain the same information. Accordingly, server system 102 removes one of the two records from the usage data. In other instances, for example where two or more records pertaining to the same aircraft are present in the usage data for the given time period, server system 102 merges the two records, for example by summing together the flight cycle or flight hours data in the multiple records and storing the summed data in a single record.

Continuing process 600, server system 102 detects 608 occurrences in the usage data where one or more aircraft was parked for an extended period of time due, for example to lack of business need for the aircraft, or due to exogenous events, such as an event in which one or more governmental entities prohibits operation of aircraft in a certain geographic region for a period of time. For example, database 108 or another source of data may include date ranges (exogenous events) during which a governmental entity such as the Federal Aviation Administration (FAA) grounded all aircraft. Server system 102 may determine that a period of time in which usage of the aircraft is low corresponds with one of the date ranges associated with an exogenous event and store an indicator in memory (e.g., database 108) that the low usage is due to an exogenous event. Next, server system 102 determines whether the usage data retrieved at step 602 includes at least three aircraft of a minor model (e.g., 777-200) of a major model (e.g., 777) for a particular carrier 222, 224, 236. More specifically, server system 102 determines 610 whether, within a major model of aircraft represented in the usage data for a particular carrier 222, 224, 236, whether three or more aircraft of a particular minor model are represented in the usage data for the carrier 222, 224, 236.

If determination 610 is yes, then server system 102 stores 612 the cleaned fleet usage data. However, if determination 610 is no, then server system 102 determines 614 whether at least three aircraft of the major model are represented in the usage data for the carrier 222, 224, 236. If determination 614 is yes, then server system 102 combines 616 the usage data for the major model aircraft for the carrier 222, 224, 236. If, on the other hand, determination 614 is no, then server system 102 combines usage data regarding aircraft of the major model with usage data for the rest of the aircraft in the fleet of the particular carrier 222, 224, 236. In some implementations, server system 102 performs process 600 for each and every carrier 222, 224, 236 represented in the usage data. Additionally, in some implementations, server system 102 performs process 600 on usage data corresponding to a predefined length of time, such as one month. In some implementations, server system 102 may store the cleaned usage data in memory, for example in database 108.

Figure 7:
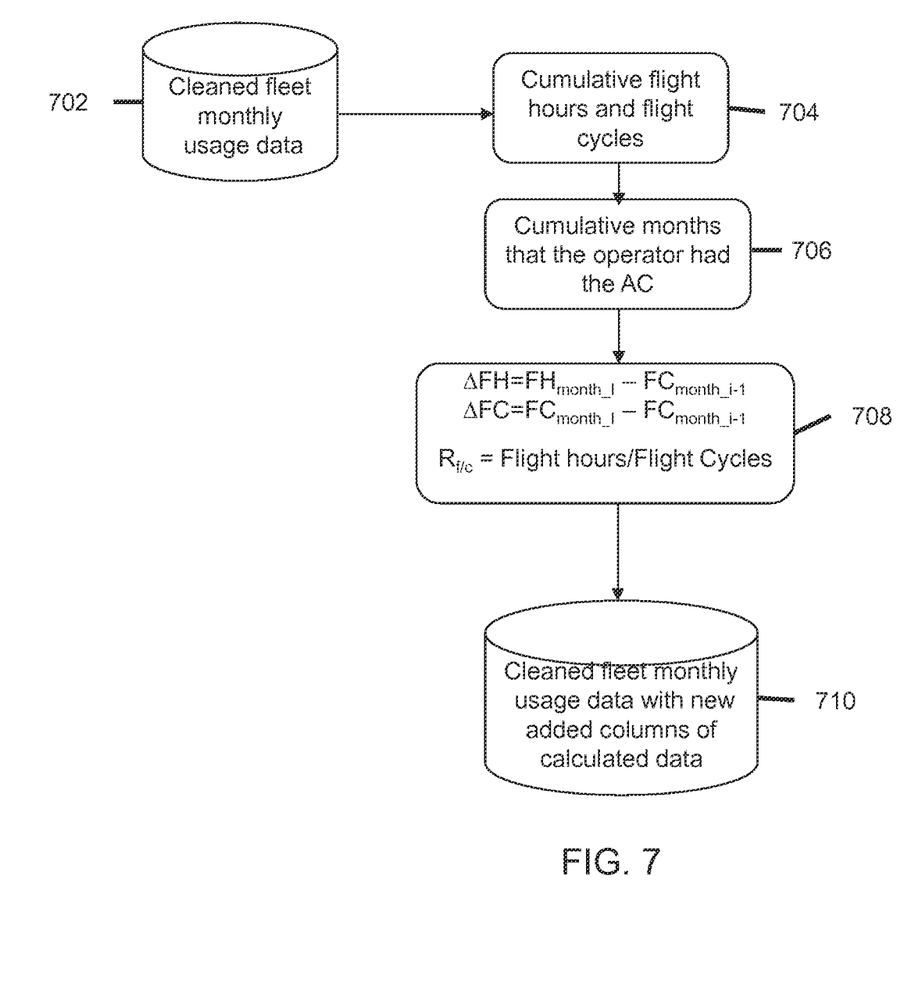
FIG. 7 is a flow chart of a process that may be implemented by the detection system of FIGS. 1 and 2 to prepare cleaned usage data for further analysis.

FIG. 7 is a flow chart of a process 700 that may be implemented by detection system 100 to prepare cleaned usage data for further analysis. Process 700 corresponds with preparation 506 of the usage data in process 500. Initially, server system 102 retrieves 702 the cleaned usage data generated in process 600. For example, server system 102 may retrieve the cleaned usage data from database 108. Next, server system 102 determines 704 cumulative flight hours and flight cycles for the aircraft represented in the cleaned usage data. For example, server system 102 may sum the flight hours included in the usage data for each aircraft associated with a particular carrier and may sum the flight cycles included in the usage data for each aircraft associated with the particular carrier 222, 224, 236. Next, server system 102 determines 706 cumulative months that the particular carrier 222, 224, 236 had ownership or control over the aircraft associated with the carrier 222, 224, 236 (aircraft ownership time) in the usage data. Next, server system 102 determines 708 a change in flight hours for each aircraft between a given month and the preceding month. Additionally, server system 102 determines a change in flight cycles for each aircraft between the given month and the preceding month. Further, server system determines a ratio of flight hours to flight cycles for the aircraft. Next, server system 102 stores 710 the cumulative months, cumulative flight cycles, changes in flight hours, changes in flight cycles, and ratio of flight hours to flight cycles in memory, for example in database 108.

Figure 8:
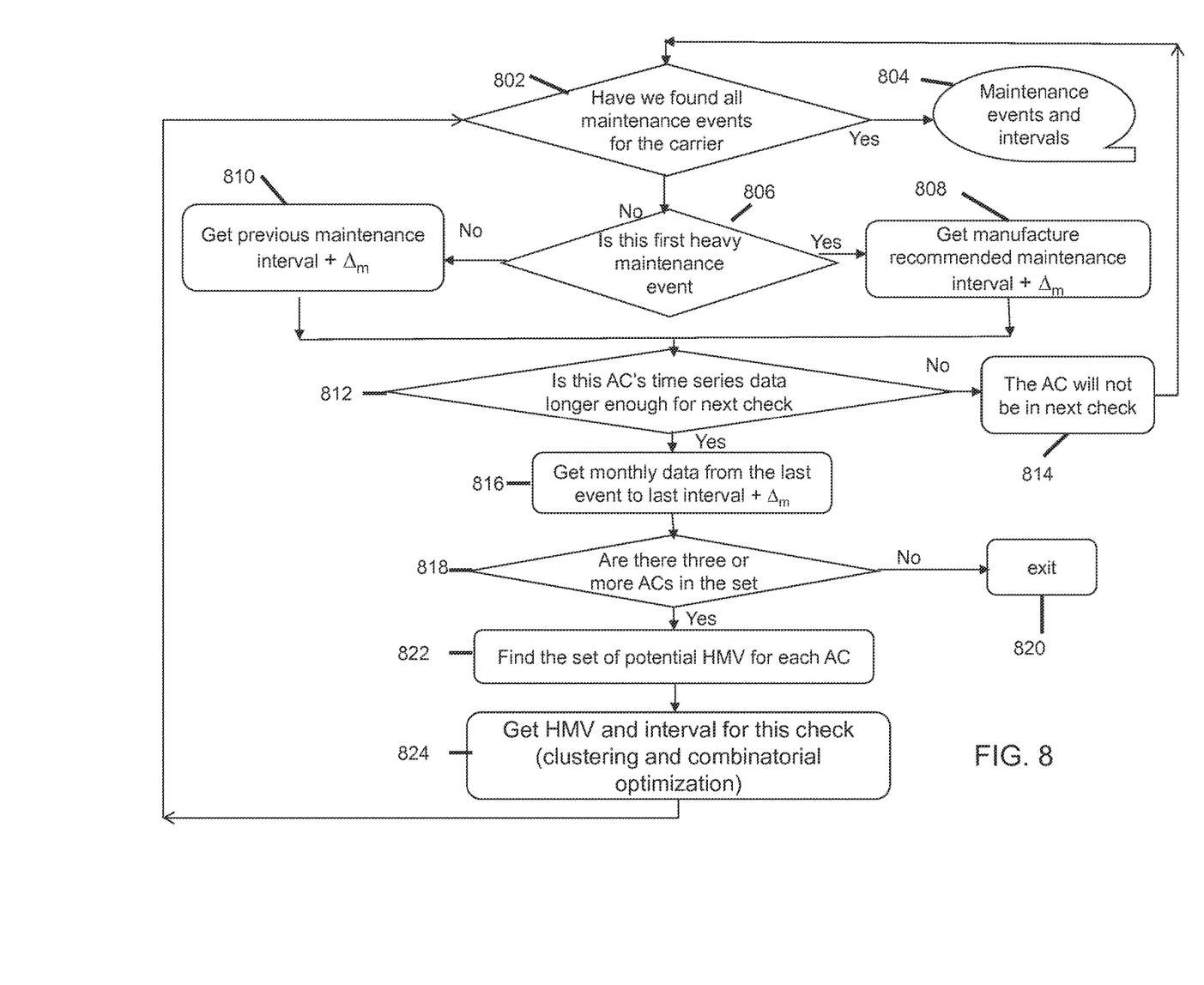
FIG. 8 is a flow chart of an adaptive learning process that may be implemented by the detection system of FIGS. 1 and 2.

FIG. 8 is a flow chart of an adaptive learning process 800 that may be implemented by detection system 100. Initially, server system 102 determines 802 whether all maintenance events have been detected for an aircraft model selected in step 514 of process 500. If determination 802 is yes, then server system 102 stores 804 the detected maintenance event, along with calculated intervals between the maintenance events in memory, for example in database 108. If the determination 802 is no, then server system 102 determines 806 whether a detected maintenance event in the usage data is the first maintenance event for the selected aircraft model.

If determination 806 is yes, then server system 102 determines 808 a maintenance interval and time offset by retrieving from memory (e.g., disk storage unit 212) a manufacturer-recommended or default maintenance interval and adding an offset of plus or minus a predetermined amount of time, for example 2 months. If determination 806 is no, then server system 102 determines 810 a maintenance interval and time offset by retrieving from memory (e.g., disk storage unit 212) a previous maintenance interval associated with the aircraft model and adding an offset of plus or minus a predetermined amount of time, for example 2 months. Next, server system 102 determines 812 whether the usage data for the selected aircraft model spans enough time to perform a check for a subsequent maintenance event. If determination 812 is no, then server system 102 determines 814 that the usage data will not be checked for a subsequent maintenance event for the selected aircraft model and returns back to determination 802, described above. If, on the other hand, determination 812 is yes, then server system 102 retrieves 816 from memory (e.g., database 108) usage data from a time period beginning with a most recent maintenance event detected in the usage data plus the maintenance interval and offset determined in one of determinations 808 and 810.

Figure 9:
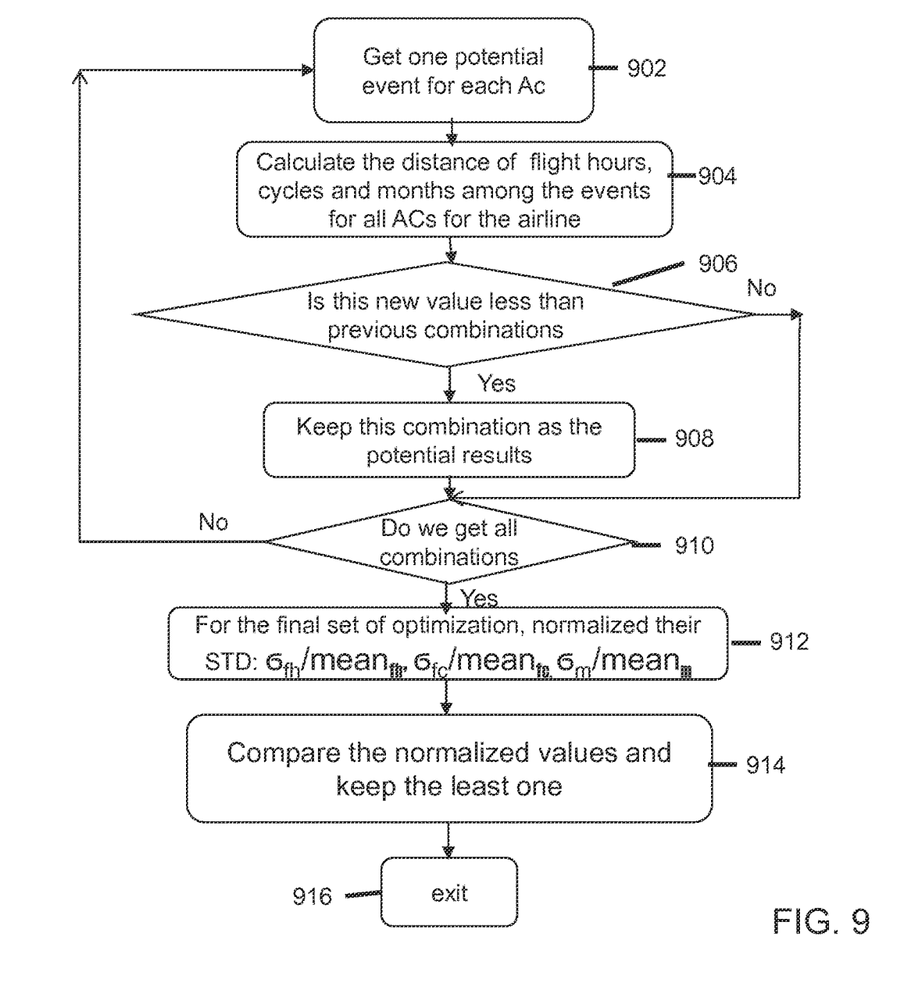
FIG. 9 is a flow chart of a clustering and combinatorial process that may be implemented by the detection system of FIGS. 1 and 2.

Next, server system 102 determines 818 whether there are three or more aircraft for the selected aircraft model. If determination 818 is no, then server system 102 exits 820 (i.e., ends) process 800. If, on the other hand, determination 818 is yes, then server system 102 detects 822 a set of possible or potential maintenance events for each aircraft model. For example, server system 102 may detect 822 a decrease in flight hours, wherein the magnitude of the decrease is greater than a predetermined threshold. For example, in the previous month, the usage data includes 1000 flight hours for an aircraft model, while the next month includes only 10 flight hours for the aircraft model. The decrease of 990 hours between the two months may exceed a predetermined threshold of, for example, 600 hours. During maintenance events, aircraft are generally flown for shorter durations. Accordingly, server system 102 may detect that the number of flight cycles or ratio of flight cycles to flight hours increased beyond a predetermined threshold. Based on such detections, server system 102 may indicate, for example in memory (e.g., database 108) that the change in flight hours, flight cycles, and/or ratio of flight hours to flight cycles represents a possible occurrence of a maintenance event. Next, server system 102 obtains 824 maintenance events and maintenance intervals for the current pass through the usage data by performing process 900, described below. Next, server system 102 returns to determination 802.

FIG. 9 is a flow chart of a clustering and combinatorial process 900 that may be implemented by detection system 100. Process 900 corresponds to clustering process 520 and combinatorial process 522 in process 500. Initially, server system 102 retrieves 902 from memory (e.g., database 108) a potential or possible maintenance event for each aircraft as indicated by server system 102 in process 800. Next, server system 102 calculates 904 a distance (e.g., a mathematical difference) for one of flight hours, flight cycles, and ownership time periods (e.g., number of months) among the possible maintenance events for all aircraft for a selected carrier 222, 224, 236 in the usage data. Each of flight hours, flight cycles, and ownership time periods is a possible indicator that the selected carrier 222, 224, 236 uses to determine when to conduct maintenance events. For example, in a ninth month, the usage data only has 10 flight hours associated with a first aircraft, whereas for nine other aircraft of the first carrier, the ninth month has a significantly higher number of flight hours, for example 3000 flight hours per aircraft. Accordingly, the ninth month for the first aircraft is an anomaly, rather than a time period during which the carrier 222, 224, 236 performs a scheduled maintenance event for the ten aircraft.

Next, server system 102 determines 906 whether the distance calculated in step 904 is less than all other distances calculated at step 904. For example, if the flight hours among the aircraft in the usage data appears to be approximately the same (i.e., low distance) for the time period that server system 102 has indicated as a possible maintenance event, then flight hours may be the indicator that the selected carrier uses for scheduling maintenance events, rather than the number of flight cycles or the length of time an aircraft has been owned by the carrier. If determination 906 is yes, then server system 102 stores 908 the combination in memory (e.g., disk storage unit 212). Next, or if determination 906 is no, server system 102 determines whether distances for all possible combinations of flight hours, flight cycles, and ownership time period have been calculated. If determination 910 is no, then server system returns to step 902.

If determination 910 is yes, then server system 102 normalizes 912 variances in the values of flight hours, flight cycles, and ownership time periods in the usage data, so that the values are not on different scales. Next, server system 102 compares 914 the normalized values and selects the least value as the indicator used by the carrier 222, 224, 236 for determining intervals between maintenance events and for scheduling maintenance events. Next, server system 102 exits 916 (i.e., ends) process 900. Server system 102 performs process 900 for every carrier 222, 224, 236 represented in the usage data.

Figure 10:
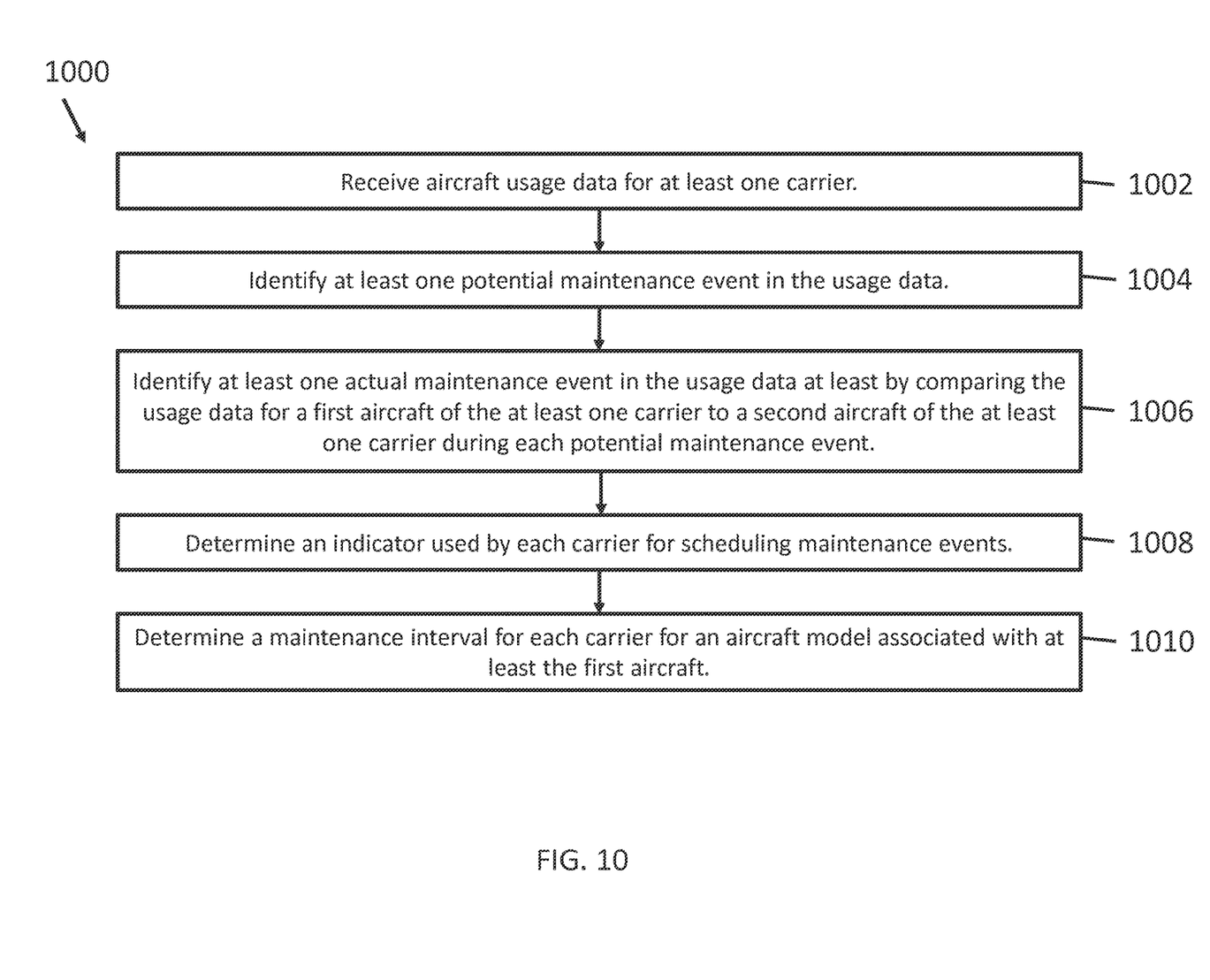
FIG. 10 is a flow chart of a process that may be implemented by the detection system of FIGS. 1 and 2 to detect maintenance events and determine maintenance intervals for aircraft.

FIG. 10 is a flow chart of a process 1000 that may be implemented by detection system 100 to detect maintenance events and determine maintenance intervals for aircraft. Initially, server system 102 receives 1002 aircraft usage data for at least one carrier 222, 224, 236. Next, server system 102 identifies 1004 at least one potential maintenance event in the usage data. Next, server system 102 identifies 1006 at least one actual maintenance event in the usage data at least by comparing the usage data for a first aircraft of the at least one carrier 222, 224, 236 to a second aircraft of the at least one carrier during each potential maintenance event. Next, server system 102 determines 1008 an indicator used by each carrier 222, 224, 236 for scheduling maintenance events. For example, the indicator may be one of flight hours, flight cycles, and ownership time for an aircraft. Next, server system 102 determines 1010 a maintenance interval for each carrier 222, 224, 236 for an aircraft model associated with at least the first aircraft. Additionally, in some implementations, server system 102 provides an estimation of when a future maintenance event for the at least one carrier 222, 224, 236 will occur. For example, server system 102 may provide a report including the estimation to client system 104.

A technical effect of systems and methods described herein includes at least one of: (a) receiving, at a computing device, aircraft usage data for at least one carrier; (b) identifying, by the computing device, at least one potential maintenance event in the usage data; (c) identifying, by the computing device, at least one actual maintenance event in the usage data at least by comparing the usage data for a first aircraft of the at least one carrier to a second aircraft of the at least one carrier during each potential maintenance event; (d) determining, by the computing device, an indicator used by each carrier for scheduling maintenance events; and (e) determining, by the computing device, a maintenance interval for each carrier for an aircraft model associated with at least the first aircraft.

As compared to known methods and systems for preparing for aircraft maintenance events, the methods and systems described herein facilitate detecting intervals and indicators used by different carriers in scheduling maintenance events, thereby enabling an aircraft parts supplier to obtain replacement parts in advance of the maintenance events.

The description of the different advantageous implementations has been presented for purposes of illustration and description, and is not intended to be exhaustive or limited to the implementations in the form disclosed. Many modifications and variations will be apparent to those of ordinary skill in the art. Further, different advantageous implementations may provide different advantages as compared to other advantageous implementations. The implementation or implementations selected are chosen and described in order to best explain the principles of the implementations, the practical application, and to enable others of ordinary skill in the art to understand the disclosure for various implementations with various modifications as are suited to the particular use contemplated. This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A detection computing device for use in detecting maintenance events and maintenance intervals, said detection computing device comprising a processor coupled to a memory, wherein said processor is in communication with a data store, said processor is programmed to:
receive, a plurality of electronic signals from a plurality of carrier computing devices, the plurality of electronic signals including aircraft usage data for at least one carrier associated with the plurality of carrier computing devices;
store the aircraft usage data in the data store;
generate one or more queries to identify at least one potential maintenance event;
submit the one or more queries to the data store to query the aircraft usage data;
receive at least one query result of the one or more queries of the data store, wherein the at least one query result includes at least one potential maintenance event;
for each at least one potential maintenance event, generate one or more additional queries to identify at least one actual maintenance event, wherein the one or more additional queries are configured to query the aircraft usage data for a first aircraft of the at least one carrier and the aircraft usage data for a second aircraft of the at least one carrier;
submit the one or more additional queries to the data store to query the aircraft usage data;
receive at least one additional query result of the one or more additional queries of the data store;
compare the aircraft usage data for a first aircraft of the at least one carrier to the aircraft usage data for a second aircraft of the at least one carrier during each potential maintenance event based on the at least one additional query result;
access the data store to determine, based at least in part on the usage data, that a decrease in usage of the first aircraft and the second aircraft is due to an exogenous event;
store, in the data store, an indication that the decrease in usage is due to the exogenous event;
determine, based on accessing the aircraft usage data in the data store, an indicator used by each carrier for scheduling maintenance events;
generate one or more further queries of the aircraft usage data to determine a maintenance interval for each carrier for an aircraft model associated with at least the first aircraft;
submit the one or more further queries to the data store to query the aircraft usage data;
receive at least one further query result of the one or more further queries;
determine the maintenance interval for each carrier for the aircraft model of the first aircraft based on the at least one further query result;
generate a predictive system for predicting one or more future maintenance events for aircraft based on each identified actual maintenance event, each determined maintenance interval, and the indicator used by each carrier;
predict, by the predictive system, a future maintenance event for an aircraft of the aircraft model associated with the first aircraft including an estimated time for the future maintenance event;
determine one or more replacement parts for the future maintenance event; and
transmit a purchase order to obtain the one or more replacement parts based on and prior to the estimated time for the future maintenance event.

2. The detection computing device of claim 1, wherein said processor is further programmed to calculate at least one of cumulative flight hours, cumulative flight cycles, and cumulative aircraft ownership time, over a predetermined time period based on the usage data.

3. The detection computing device of claim 1, wherein the usage data includes flight hours, flight cycles, and aircraft ownership time and wherein said processor is further programmed to:
determine that the indicator is one of the flight hours, the flight cycles, and the aircraft ownership time, based on calculating a distance between the flight hours, the flight cycles, and aircraft ownership time of the first aircraft and the second aircraft.

4. The detection computing device of claim 1 wherein said processor is further programmed to normalize variances in flight hours, flight cycles, and aircraft ownership time between at least one previous maintenance event and at least one newly mined event in the usage data.

5. The detection computing device of claim 1, wherein said processor is further programmed to identify a first potential maintenance event in the usage data based at least in part on a manufacturer-provided maintenance interval, using at least one of flight hours, flight cycles, and cumulative time for the at least one carrier.

6. The detection computing device of claim 1, wherein said processor is further programmed to calculate at least one of a duration between a first time period and a second time period based on the usage data, a difference between flight hours in the first time period and flight hours in the second time period based on the usage data, and a difference between flight cycles in the first time period and flight cycles in the second time period based on the usage data.

7. The detection computing device of claim 1, wherein said processor is further programmed to cluster multiple potential maintenance events from each aircraft of the at least one carrier based on at least one of a flight hours calculation, a flight cycles calculation, and a calculated duration between maintenance events.

8. The detection computing device of claim 1, wherein said processor is further programmed to compare at least two clusters and select one of the clusters with the least value of distance among flight hours, flight cycles and calculated duration within the cluster.

9. The detection computing device of claim 1, wherein said processor is further programmed to determine consequent maintenance events and intervals based on at least one previous interval that has been determined for the at least one carrier.

10. The detection computing device of claim 1, wherein said processor is further programmed to apply an adaptive learning algorithm to generate the predictive system for predicting one or more future maintenance events for aircraft based on each identified actual maintenance event.

11. A method for use in detecting maintenance events and maintenance intervals, the method implemented by a detection computing device including a processor in communication with a memory, the method comprising:
receiving, by the detection computing device from a plurality of carrier computing devices, a plurality of electronic signals, the plurality of electronic signals including aircraft usage data for at least one carrier associated with the plurality of carrier computing devices;

storing the aircraft usage data in a data store;
generating one or more queries to identify at least one potential maintenance event;
submitting, by the detection computing device, the one or more queries to the data store to query the aircraft usage data;
receiving, by the detection computing device, at least one query result of the one or more queries of the data store, wherein the at least one query result includes at least one potential maintenance event;
for each at least one potential maintenance event, generating, by the detection computing device, one or more additional queries to identify at least one actual maintenance event, wherein the one or more additional queries are configured to query the aircraft usage data for a first aircraft of the at least one carrier and the aircraft usage data for a second aircraft of the at least one carrier;
submitting, by the detection computing device, the one or more additional queries to the data store to query the aircraft usage data;
receiving, by the detection computing device, at least one additional query result of the one or more additional queries of the data store;
comparing, by the detection computing device, the aircraft usage data for a first aircraft of the at least one carrier to the aircraft usage data for a second aircraft of the at least one carrier during each potential maintenance event based on the at least one additional query result;
accessing the data store to determine, by the detection computing device, based at least in part on the usage data, that a decrease in usage of the first aircraft and the second aircraft is due to an exogenous event;
storing, in the data store by the detection computing device, an indication that the decrease in usage is due to the exogenous event;
determining, by the detection computing device and based on accessing the aircraft usage data in the data store, an indicator used by each carrier for scheduling maintenance events;
generating, by the detection computing device, one or more further queries to the aircraft usage data to determine a maintenance interval for each carrier for an aircraft model associated with at least the first aircraft;
submitting, by the detection computing device, the one or more further queries to the data store to query the aircraft usage data;
receiving, by the detection computing device, at least one further query result of the one or more further queries;
determining, by the detection computing device, the maintenance interval for each carrier for the aircraft model of the first aircraft based on the at least one further query result;
generating, by the detection computing device, a predictive system for predicting one or more future maintenance events for aircraft based on each identified actual maintenance event, each determined maintenance interval, and the indicator used by each carrier;
predicting, by the predictive system, a future maintenance event for an aircraft of the aircraft model associated with the first aircraft including an estimated time for the future maintenance event;
determining one or more replacement parts for the future maintenance event; and
transmitting a purchase order to obtain the one or more replacement parts based on and prior to the estimated time for the future maintenance event; and
performing maintenance using the obtained one or more replacement parts.

12. The method of claim 11, further comprising calculating at least one of cumulative flight hours, cumulative flight cycles, and cumulative aircraft ownership time, over a predetermined time period based on the usage data.

13. The method of claim 11, wherein the usage data includes flight hours, flight cycles, and aircraft ownership time, the method further comprising:
determining that the indicator is one of the flight hours, the flight cycles, and the aircraft ownership time, based on calculating a distance between the flight hours, the flight cycles, and the aircraft ownership time of the first aircraft and the second aircraft.

14. The method of claim 11, further comprising normalizing variances in flight hours, flight cycles, and aircraft ownership time between at least one previous maintenance event and at least one newly mined event in the usage data.

15. The method of claim 11, further comprising identifying a first potential maintenance event in the usage data based at least in part on a manufacturer-provided maintenance interval, using at least one of flight hours, flight cycles, and cumulative time for the at least one carrier.

16. The method of claim 11, further comprising calculating a difference between flight hours in a first time period and flight hours in a second time period based on the usage data, a duration between the first time period and the second time period based on the usage data, and a difference between flight cycles in the first time period and flight cycles in the second time period based on the usage data.

17. The method of claim 11, further comprising clustering multiple potential maintenance events from each aircraft of the at least one carrier based on at least one of a flight hours calculation, a flight cycles calculation, and a calculated duration between maintenance events.

18. The method of claim 11, further comprising comparing at least two clusters and selecting one of the clusters with the least value of distance among flight hours, flight cycles and calculated duration within the cluster.

19. The method of claim 11, further comprising determining consequent maintenance events and intervals based on at least one previous interval that has been determined for the at least one carrier.

20. A non-transitory computer-readable storage device having computer-executable instructions embodied thereon for use in detecting maintenance events and maintenance intervals, wherein, when executed by a detection computing device including a processor coupled to a memory, the computer-executable instructions cause the detection computing device to:
receive a plurality of electronic signals from a plurality of carrier computing devices, the plurality of electronic signals including aircraft usage data for at least one carrier associated with the plurality of carrier computing devices;
store the aircraft usage data in a data store;
generate one or more queries to identify at least one potential maintenance event;
submit the one or more queries to a data store to query the aircraft usage data;
receive at least one query result of the one or more queries of the data store, wherein the at least one query result includes at least one potential maintenance event;

for each at least one potential maintenance event, generate one or more additional queries to identify at least one actual maintenance event, wherein the one or more additional queries are configured to query the aircraft usage data for a first aircraft of the at least one carrier and the aircraft usage data for a second aircraft of the at least one carrier;

submit the one or more additional queries to query the aircraft usage data;

receive at least one additional query result of the one or more additional queries of the data store;

compare the aircraft usage data for a first aircraft of the at least one carrier to the aircraft usage data for a second aircraft of the at least one carrier during each potential maintenance event based on the at least one additional query result;

access the data store to determine, based at least in part on the usage data, that a decrease in usage of the first aircraft and the second aircraft is due to an exogenous event;

store, in the data store, an indication that the decrease in usage is due to the exogenous event;

determine, based on accessing the aircraft usage data in the data store, an indicator used by each carrier for scheduling maintenance events;

generate one or more further queries of the aircraft usage data to determine a maintenance interval for each carrier for an aircraft model associated with at least the first aircraft;

submit the one or more further queries to the data store to query the aircraft usage data;

receive at least one further query result of the one or more further queries;

determine the maintenance interval for each carrier for the aircraft model of the first aircraft based on the at least one further query result;

generate a predictive system for predicting one or more future maintenance events for aircraft based on each identified actual maintenance event, each determined maintenance interval, and the indicator used by each carrier;

predict, by the predictive system, a future maintenance event for an aircraft of the aircraft model associated with the first aircraft including an estimated time for the future maintenance event;

determine one or more replacement parts for the future maintenance event; and transmit a purchase order to obtain the one or more replacement parts based on and prior to the estimated time for the future maintenance event.

* * * * *